(12) United States Patent
Roll et al.

(10) Patent No.: US 11,174,887 B2
(45) Date of Patent: Nov. 16, 2021

(54) WOOD SCREW AND METHOD FOR PRODUCING A WOOD SCREW

(71) Applicant: SWG Schraubenwerk Gaisbach GmbH, Waldenburg (DE)

(72) Inventors: Patrick Roll, Schwäbisch Hall (DE); Joachim Glattbach, Pfedelbach (DE)

(73) Assignee: SWG SCHRAUBENWERK GAISBACH GMBH

( * ) Notice: Subject to any disclaimer, the term of this patent is extended or adjusted under 35 U.S.C. 154(b) by 261 days.

(21) Appl. No.: 16/462,074

(22) PCT Filed: Nov. 21, 2017

(86) PCT No.: PCT/EP2017/079903
§ 371 (c)(1),
(2) Date: May 17, 2019

(87) PCT Pub. No.: WO2018/091732
PCT Pub. Date: May 24, 2018

(65) Prior Publication Data
US 2019/0331152 A1    Oct. 31, 2019

(30) Foreign Application Priority Data
Nov. 21, 2016   (DE) ............... 10 2016 222 937.0

(51) Int. Cl.
| | |
|---|---|
| *F16B 25/00* | (2006.01) |
| *B21H 3/02* | (2006.01) |
| *B21K 1/56* | (2006.01) |
| *F16B 25/10* | (2006.01) |

(52) U.S. Cl.
CPC ........... *F16B 25/0084* (2013.01); *B21H 3/02* (2013.01); *B21K 1/56* (2013.01); *F16B 25/0015* (2013.01); *F16B 25/00* (2013.01); *F16B 25/0042* (2013.01); *F16B 25/103* (2013.01)

(58) Field of Classification Search
CPC .. F16B 25/00; F16B 25/0015; F16B 25/0042; F16B 25/0084; F16B 25/10; F16B 25/103; B21H 3/02; B21K 1/56
USPC ............ 411/386, 387.1, 387.2, 387.3, 387.5, 411/387.8
See application file for complete search history.

(56) References Cited

U.S. PATENT DOCUMENTS

| | | | |
|---|---|---|---|
| 3,738,218 A | | 6/1973 | Gutshall |
| 4,114,507 A | | 9/1978 | Fischer et al. |
| 4,125,050 A | * | 11/1978 | Schwartzman ..... F16B 25/0084 408/228 |

(Continued)

FOREIGN PATENT DOCUMENTS

| | | |
|---|---|---|
| DE | 20 2007 011 292 | 11/2007 |
| GB | 2 101 022 | 1/1983 |

*Primary Examiner* — Roberta S Delisle
(74) *Attorney, Agent, or Firm* — Boyle Fredrickson, S.C.

(57) ABSTRACT

The invention relates to a wood screw having a screw head having a drive configuration, a screw shank which emanates from the screw head and which at least in portions is provided with a thread, and a drilling tip which adjoins the thread, wherein the drilling tip is configured without a thread, wherein the drilling tip has two longitudinal cutters which continue up to a terminal point of the drilling tip and which run so as to be curved in relation to a central longitudinal axis of the screw, and wherein a circumference of the drilling tip between the two longitudinal cutters does not have any further cutters.

14 Claims, 4 Drawing Sheets

(56) References Cited

U.S. PATENT DOCUMENTS

| | | | |
|---|---|---|---|
| 4,147,088 A | 4/1979 | Whittaker, Jr. | |
| 4,301,563 A | 11/1981 | Deveney, Jr. | |
| 4,793,756 A | 12/1988 | Baumgartner | |
| 4,834,602 A * | 5/1989 | Takasaki | F16B 25/0015 411/386 |
| 5,015,134 A * | 5/1991 | Gotoh | F16B 25/0015 411/386 |
| 5,188,496 A * | 2/1993 | Giannuzzi | F16B 25/00 411/310 |
| 5,329,738 A * | 7/1994 | Ovaert | E04D 5/142 52/410 |
| 5,759,003 A | 6/1998 | Greenway et al. | |
| 8,348,572 B2 * | 1/2013 | Friederich | F16B 25/106 411/387.1 |
| 8,348,574 B2 * | 1/2013 | Lai | B21H 3/027 411/387.7 |
| 9,228,603 B2 * | 1/2016 | Lin | F16B 25/106 |
| 2003/0235483 A1 * | 12/2003 | Chen | F16B 25/0073 411/387.7 |
| 2009/0010734 A1 * | 1/2009 | Lin | F16B 23/003 411/413 |
| 2013/0039720 A1 * | 2/2013 | Shih | F16B 25/0015 411/387.4 |

* cited by examiner

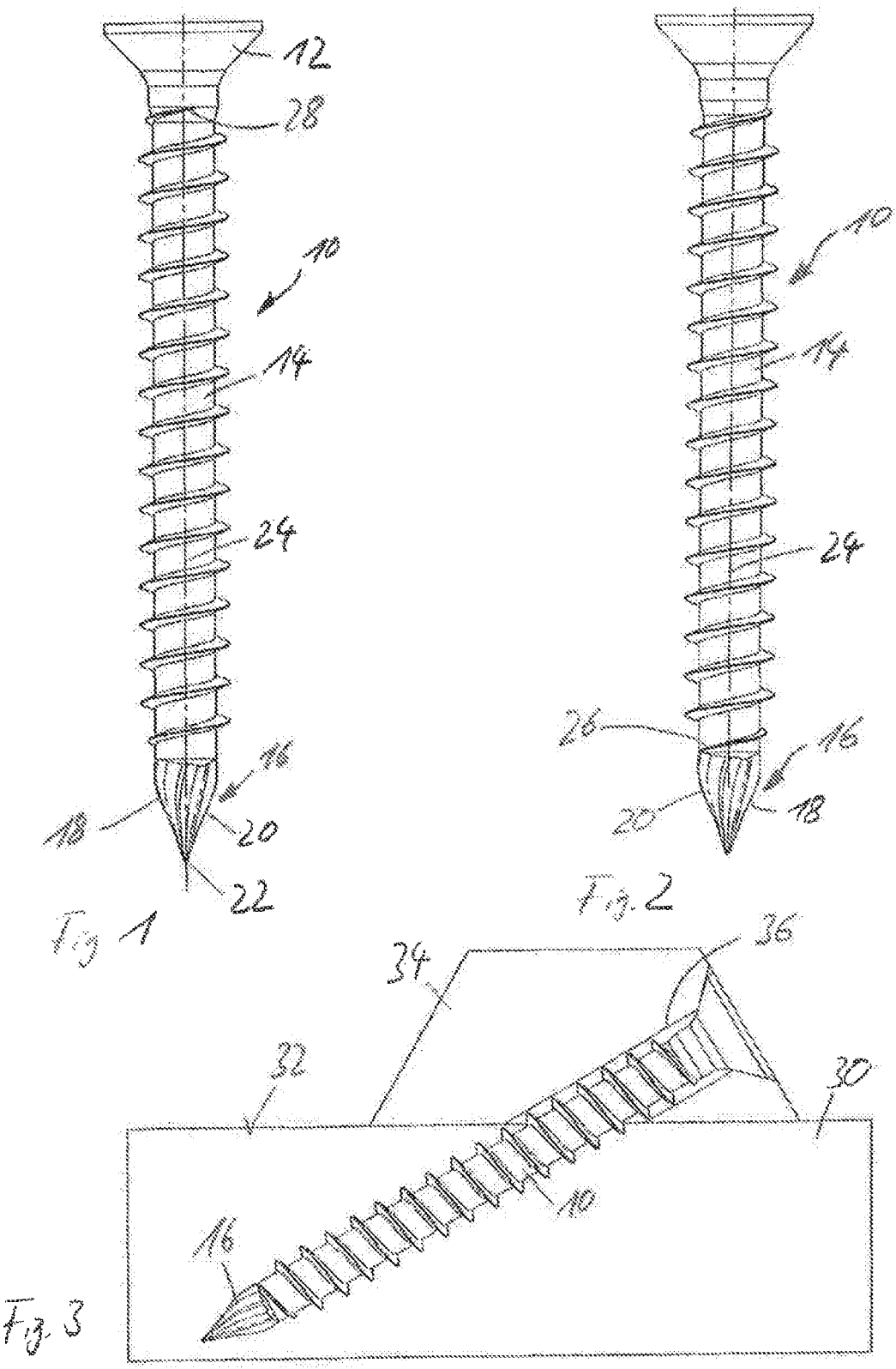

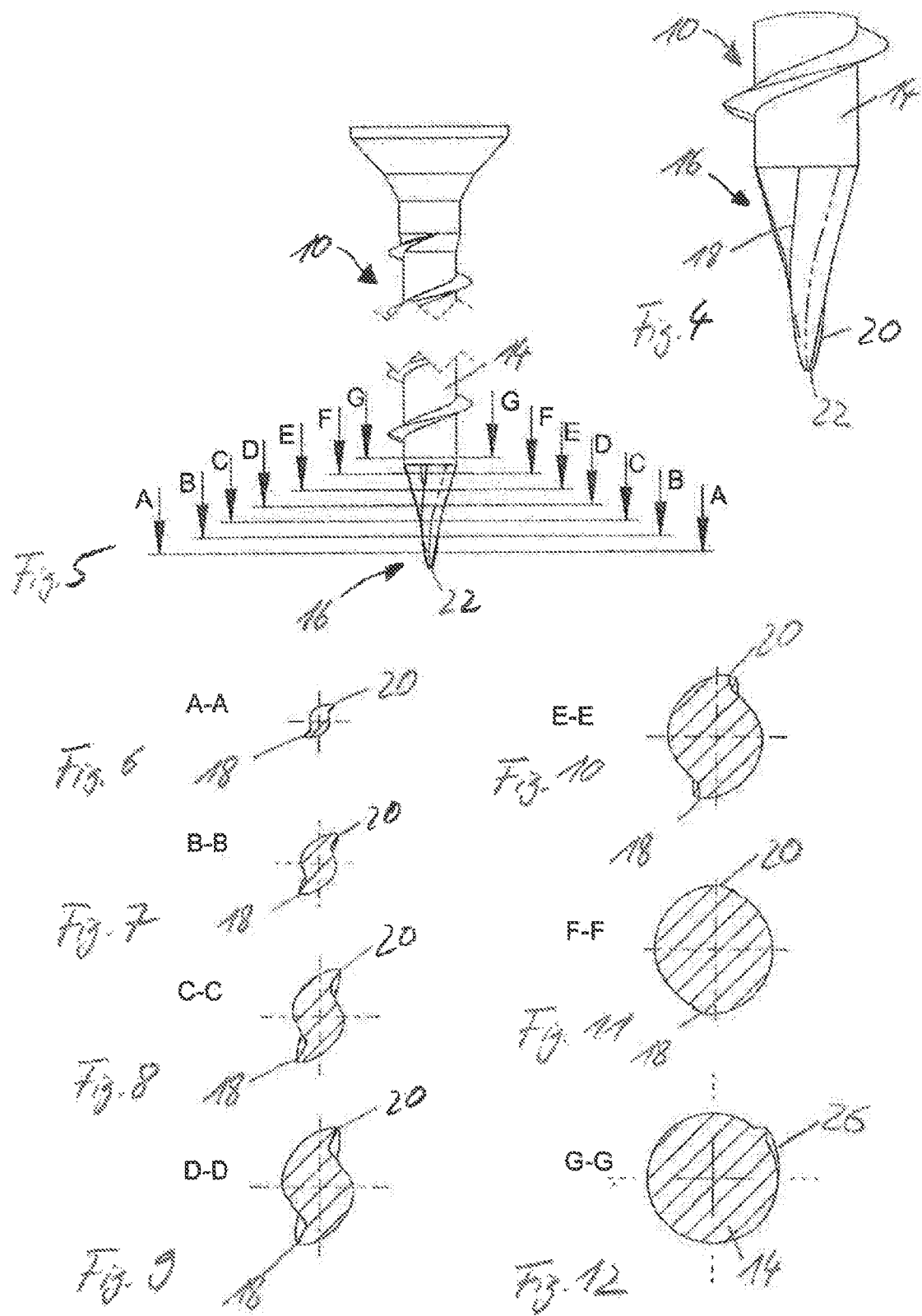

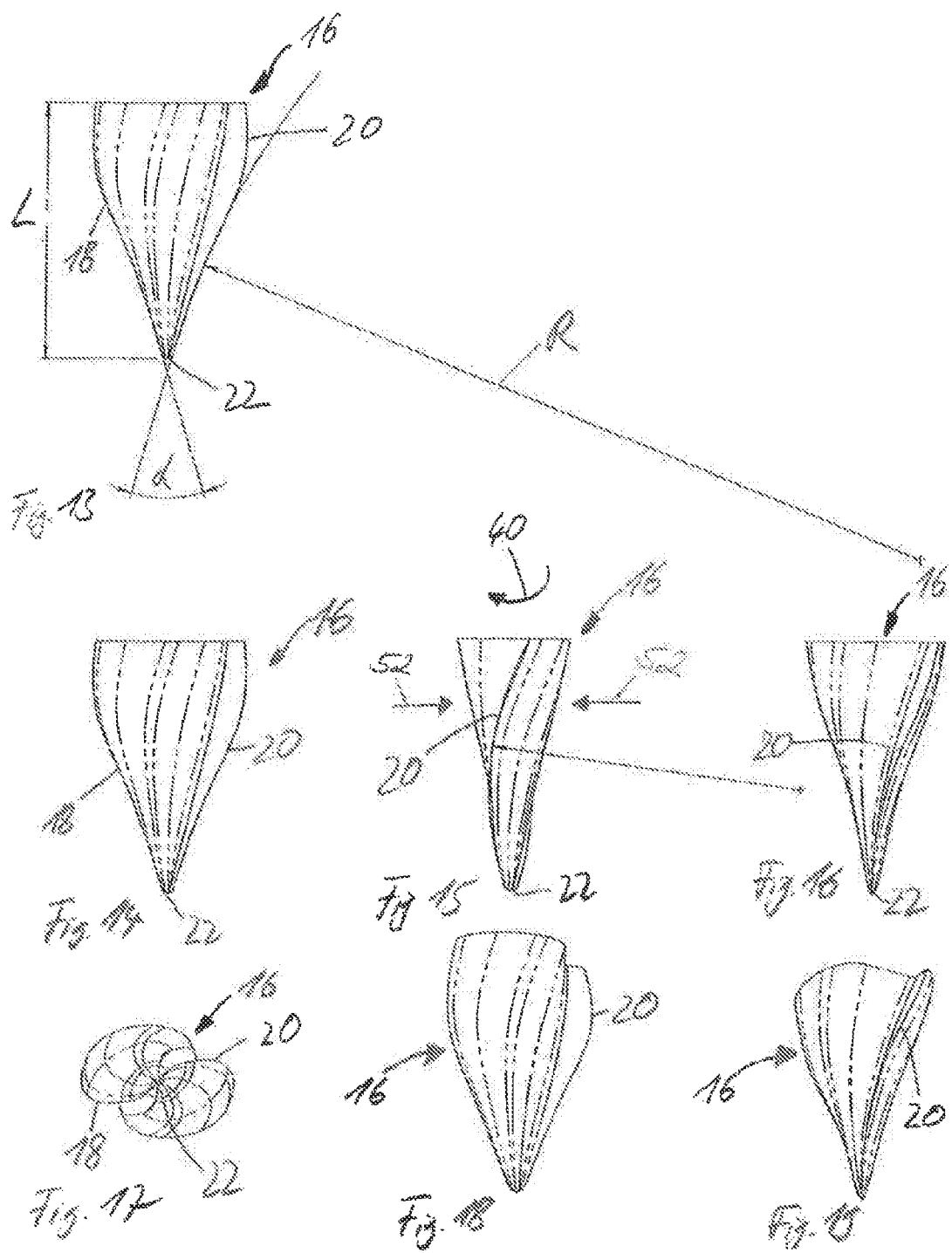

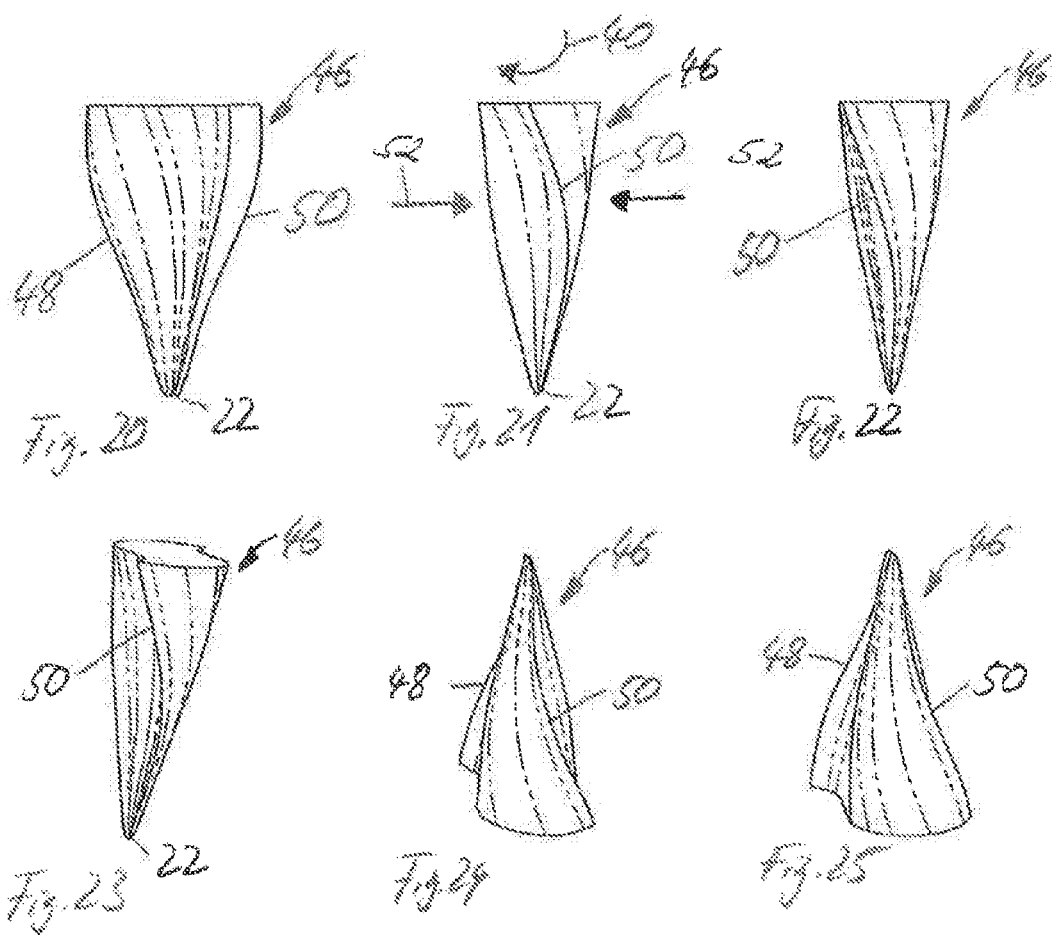

WOOD SCREW AND METHOD FOR PRODUCING A WOOD SCREW

FIELD OF THE APPLICATION

The invention relates to a wood screw having a screw head having a drive configuration, a screw shank which emanates from the screw head and which at least in portions is provided with a thread, and a drilling tip which adjoins the thread. The invention also relates to a method for producing a wood screw according to the invention.

BACKGROUND

Slanted screw connections in which wood screws are piloted in a slanted manner with respect to a surface of a wood element into which the screws are to be screwed, and then screwed into said surface in a slanted manner, are increasingly being adapted in professional carpentry. Such slanted screw connections have significant advantages in terms of transmitting a force by means of the screws, in particular when using so-called fully threaded screws which have a continuous thread from the lower side of the screw head up to a screw tip. So-called biting, thus the intrusion of the screw into the wood element until the thread of the screw engages, can be problematic in the case of very obtuse angles at which a screw is piloted in the case of a slanted screw connection.

SUMMARY

A wood screw is to be improved in terms of the piloting behavior thereof by way of the invention.

To this end, a wood screw having a screw head having a drive configuration, a screw shank which emanates from the screw head and which at least in portions is provided with a thread, and a drilling tip which is disposed on the end of the screw shank that is opposite the screw head is provided according to the invention, in which wood screw the drilling tip is configured without a thread, in which the drilling tip has two longitudinal cutters which continue up to a terminal point of the drilling tip and which run so as to be curved in relation to a central longitudinal axis of the screw, and in which a circumference of the drilling tip between the two longitudinal cutters does not have any further cutters.

Providing a drilling tip having only two longitudinal cutters which run so as to be curved and continue up to a terminal point of the drilling tip significantly improves so-called piloting or biting of the drilling tip when placed onto the surface of a wood element, in particular also when piloting in a slanted manner in the context of a slanted screw connection. The wood screw according to the invention herein has significant advantages also in relation to commercially available brad point drill bits which typically stray when starting to drill in a slanted manner a wood surface, or bump along on the wood surface until a depression for the drill to be correctly piloted has been achieved. The wood screw according to the invention by contrast is distinguished by a problem-free intrusion into a wood surface even when piloted in a manner slanted even by relatively small angles, even by less than 45°. The drilling tip terminates where the thread begins on the shank, for example. This transition can lie at the beginning of the cylindrical thread on the shank. However, the transition region between the beginning of the cylindrical thread and the thread-free drilling tip can also be configured by rolling the thread after the pinching of the drilling tip. This transition region then has portions of a thread pitch and optionally portions of the longitudinal cutters, for example. The transition region can have a basic shape which tapers toward the drilling tip, a cylindrical basic shape or else a basic shape that tapers in portions and is cylindrical in portions. A thread-free region can also lie between the shank-side end of the drilling tip and the beginning of the thread on the shank.

In a refinement of the invention, the longitudinal cutters run consistently and without interruptions and corners.

Such a profile of the longitudinal cutters facilitates the rapid intrusion into a wood surface when screwing in a slanted manner.

In a refinement of the invention the longitudinal cutters continue across the entire length of the drilling tip up to the terminal point of the latter.

In this way, the longitudinal cutters can ensure problem-free piloting of the screw and then also for the screw to be drawn into the wood material up to the point where the thread then engages in the wood material and pulls the screw further into the wood material.

In a refinement of the invention the two longitudinal cutters run in a helical manner up to the terminal point of the drilling tip.

It has been demonstrated that a helical profile of the two longitudinal cutters significantly improves the so-called biting of the screw when piloting, in particular when screwing in a slanted manner, as compared to a linear configuration of the longitudinal cutters.

In a refinement of the invention the longitudinal cutters, when viewed in the circumferential direction and across the length of the drilling tip, run in each case across at most one quarter, in particular at most one half, of the circumference of the drilling tip.

On account thereof, the longitudinal cutters conjointly with the central longitudinal axis of the wood screw enclose a comparatively small angle and, on account thereof, ensure that the drilling tip is rapidly drawn into the wood material. While the longitudinal cutters do not represent a thread, said longitudinal cutters on account of the helical configuration do have a thread-like effect and, on account thereof, ensure rapid biting of the screw and the problem-free configuration of an initial depression in which the thread of the screw can then engage.

In a refinement of the invention the longitudinal cutters, when viewed in a driving-in direction of the thread, run so as to be outwardly curved across the entire length of the drilling tip.

In a refinement of the invention the longitudinal cutters, when viewed in a driving-in direction of the thread, run so as to be inwardly curved across the entire length of the drilling tip.

In a refinement of the invention the longitudinal cutters of the drilling tip, when viewed in a direction perpendicular to the central longitudinal axis, proceeding from the terminal point have an inwardly curved contour.

Problem-free piloting and biting of the screw when screwing in a slanted manner is significantly improved by such an inwardly curved contour. The longitudinal cutters herein are viewed perpendicularly to a plane in which the largest mutual spacing of the longitudinal cutters lies. In other words, the longitudinal cutters herein are viewed perpendicularly to a pinching plane in which the longitudinal cutters in the production of the drilling tip are thus produced using two pinching jaws that converge in a manner perpendicular to the pinching plane.

In a refinement of the invention the longitudinal cutters of the drilling tip, when viewed in a direction perpendicular to the central longitudinal axis, proceeding from the transition to the thread have an outwardly curved contour.

Such an outwardly curved contour shortly before, or up to, respectively, the transition to the thread ensures a problem-free transition which is not perceptible to an operator when the thread in the driving-in of the wood screw engages in the depression that is configured by the drilling tip.

In a refinement of the invention, the outwardly curved contour of the longitudinal cutters, proceeding from the thread to the terminal point of the drilling tip, transitions to the inwardly curved contour after one quarter, in particular one third, of the length of the drilling tip.

In a refinement of the invention, the longitudinal cutters at the terminal point of the drilling tip enclose an angle of 20° to 90°, in particular 30° to 60°.

Such an angle of less than 90° between the longitudinal cutters improves the piloting or biting, respectively, of the wood screw in the case of a slanted screw connection.

In a refinement of the invention the angle enclosed by the longitudinal cutters, proceeding from the terminal point of the drilling tip, remains substantially constant up to one quarter, in particular one third, of the length of the drilling tip.

In a refinement of the invention the drilling tip in sectional planes which run so as to be perpendicular to the central longitudinal axis of the screw, at the transition from the drilling tip to the thread initially has a circular cross section, and then up to the terminal point has an S-type cross section, wherein the two corner points of the S-type cross section are defined by the longitudinal edges.

The wood screw according to the invention thus has a drilling tip which is designed in a fundamentally different manner as compared to known drilling tips or drill bits. Such a drilling tip surprisingly has significant advantages when using a wood screw according to the invention for the slanted screw connection.

In a refinement of the invention the two longitudinal cutters, at the shank-side end of the drilling tip, in the radial direction have a mutual spacing which corresponds to the core diameter of the thread.

In a refinement of the invention the thread begins at the shank-side end of the drilling tip by way of a very minor height of the thread flanks, or a height zero of the thread flanks.

The biting or engaging, respectively, of the thread in the depression achieved by the drilling tip when driving in the screw is facilitated on account of these measures.

The object on which the invention is based is also achieved by a method for producing a wood screw, in which method the following is provided: producing a blank having a screw head and a shank which in the portion provided for the drilling tip is cylindrical; pinching the drilling tip by converging two pinching jaws while interposing the shank; and subsequent to the pinching procedure, rolling a thread onto the shank.

In that the rolling of the thread is performed after the pinching of the drilling tip, the transition region between the drilling tip and the thread can be rolled such that the longitudinal cutters are rendered to the core diameter of the thread, on account of which a soft transition between the drilling tip and the thread is achieved. Alternatively, the drilling tip is not rolled, on account of which a diameter of the drilling tip at the transition to the thread is then larger than the core diameter of the thread. A thread-free portion of the shank can also lie between the beginning of the thread on the shank and the drilling tip.

In a refinement of the invention, a pinching burr is removed when rolling the thread, said pinching burr containing material which in the pinching of the drilling tip is displaced to a region outside the drilling tip.

The removal of the so-called pinching burr is performed when rolling the thread. A pinching burr is typically provided in order to keep the two pinching jaws from contacting one another when pinching the drilling tip. The pinching burr in this instance is typically connected to the longitudinal cutters by way of a very thin web and can be removed, optionally even readily by hand. The additional operational step of removing the pinching burr is however dispensed with in the case of the method according to the invention, since the pinching burr is automatically removed when rolling the thread.

BRIEF DESCRIPTION OF THE DRAWINGS

Further features and advantages of the invention are derived from the claims and the description hereunder of preferred embodiments of the invention in conjunction with the drawings. Individual features of the various embodiments illustrated and described herein can be combined with one another in an arbitrary manner without exceeding the scope of the invention. In the drawings:

FIG. 1 shows a lateral view of a wood screw according to the invention;

FIG. 2 shows a further lateral view of the wood screw according to the invention, the latter in relation to the illustration of FIG. 1 being rotated by 180° about the central longitudinal axis of said wood screw;

FIG. 3 shows a schematic lateral view of the wood screw of FIG. 1 in a driven-in state;

FIG. 4 shows an illustration of the wood screw of FIG. 1 in portions, wherein the wood screw of FIG. 4 in relation to the illustration of FIG. 1 is rotated by 90° about the central longitudinal axis;

FIG. 5 shows a further illustration of the wood screw of FIG. 4 in portions, wherein a plurality of sectional planes are indicated;

FIGS. 6 to 12 show views onto the sectional planes plotted in FIG. 5;

FIG. 13 shows a lateral view of the drilling tip of the wood screw of FIG. 1;

FIGS. 14 to 16 show lateral views of the drilling tip of FIG. 13 in various rotated positions about the central longitudinal axis of the screw;

FIG. 17 shows a view of the drilling tip of FIG. 13 from below onto the terminal point of the drilling tip;

FIGS. 18 and 19 show oblique views of the drilling tip of FIG. 13 from the front, from different viewing angles;

FIG. 20 shows a lateral view of a drilling tip for a wood screw according to a further embodiment of the invention;

FIGS. 21 and 22 show the drilling tip of FIG. 20 in a lateral view and in various rotated positions about the central longitudinal axis of the screw; and FIGS. 23 to 25 show perspective views of the drilling tip of FIG. 20 from different viewing angles.

DETAILED DESCRIPTION

The illustration of FIG. 1 shows a wood screw 10 according to the invention having a screw head 12 and a screw shank 14 that emanates from the screw head 12 in a lateral view. The screw head 12 on the upper side thereof has a drive configuration (not visible in FIG. 1) and in the case of the embodiment of the invention illustrated is configured as a countersunk head. In principle, the screw head 12 can assume arbitrary shapes.

The shank 14 is provided with a thread, in particular a wood thread, which continues from the lower side of the screw head 12 up to the beginning of a drilling tip 16. The drilling tip 16 per se is configured without a thread and has two longitudinal cutters 18, 20 which, from the transition between the shank 14 provided with the thread to the drilling tip 16, continue up to a terminal point 22 of the drilling tip 16. The wood screw 10 is configured as a fully threaded screw.

The viewing direction in FIG. 1 is onto a plane of the drilling tip 16 in which the longitudinal cutters 18, 20 have the largest mutual spacing.

The illustration of FIG. 2 shows the screw 10 in a further lateral view, wherein the screw 10 is rotated by 180° in relation to the illustration of FIG. 1. The drilling tip 16 per se is unchanged in relation to the illustration of FIG. 1, since the drilling tip is configured so as to be axially symmetrical in relation to a central longitudinal axis 24 of the screw 10. The rotated position about the central longitudinal axis 24 that has changed in relation to FIG. 1 can be seen by comparing the beginning 26 of the thread at the transition between the thread and the drilling tip 16. Said beginning 26 can be seen in FIG. 2, and it can also be seen that the thread on the shank 14, at the transition from the drilling tip 16 to the thread, begins by way of a flank height of zero or only a very small flank height.

By contrast, it can be seen in FIG. 1 that the thread on the lower side of the head 12 has an end 28 at which the flank height is likewise substantially zero.

The illustration of FIG. 3 shows a schematic illustration of the wood screw 10 in the driven-in-state. The wood screw 10 is driven into a wooden component 30, and a fitting part 34 is fastened by means of the wood screw 10 on a surface 32 of the wooden component 30. The fitting part 34 serves for fastening a further fitting part (not illustrated) in a form-fitting manner.

The wood screw 10 is driven into the surface 32 of the wooden component 30 in a slanted manner. This improves the strength of the connection between the fitting part 34 and the wooden component 30, since it is possible by way of the slanted screw connection of the wood screw 10 for the latter to be also subjected to tension in the case of stress on the fitting part 34 and on the wooden component 30.

The fitting part 34 has a screw duct 36 which runs so as to be slanted in relation to an upper side and a lower side of the fitting part 34. When the wood screw 10 is introduced into the screw duct 36 and is then set in rotation, the drilling tip 16 thus has to intrude into the wooden component 30 from a position which is piloted in a slanted manner. In the case of such a slanted screw connection, moreover also in the case of a slanted screw connection of the wood screw 10 without utilizing the fitting part 34, for example when the wood screw 10 is screwed in a slanted manner through two wooden components that bear on top of one another, the design embodiment according to the invention of the drilling tip 16 facilitates so-called biting of the wood screw 10, thus the engagement of the drilling tip 16 and subsequently of the thread in the material of the wooden component 30. Specifically, only the terminal point 22 of the drilling tip 16 initially sits on top of the surface 32. As soon as the wood screw 10 is set in rotation and simultaneously pushed in the direction onto the wooden component 30, in a manner parallel to the central longitudinal axis 24 of said wood screw 10, the two longitudinal cutters 18, 20 which continue up to the terminal point 22 of the drilling tip 16 engage in the material of the wooden component 30 and achieve a depression in the surface 32. Said depression, on account of the shape of the drilling tip 16 that, proceeding from the terminal point 22, widens, and of the diverging longitudinal cutters 18, 20, is increased in terms of width and depth until the beginning 26 of the thread engages in the depression thus achieved and upon further rotation of the screw 10 can then move the latter into the material of the wooden component 30. The longitudinal cutters 18, 20 when penetrating into the material of the wooden component 30 herein also ensure a splitting tendency of the wood that is reduced in relation to conventional wood screws.

The illustration of FIG. 4 shows the wood screw 10 in portions and only in the region of the drilling tip 16 and of the transition to the shank 14. The screw 10 herein is in each case rotated by 90° in relation to the illustration of FIG. 1 and of FIG. 2. On account thereof, only the full length of the longitudinal cutter 18 can be seen in the illustration of FIG. 4, whereas the longitudinal cutter 20 is largely obscured and can be seen only in the region that directly adjoins the terminal point 22 of the drilling tip 16.

The illustration of FIG. 5 shows the wood screw 10 in portions in the same rotated position as in FIG. 4. FIG. 5 serves for highlighting the position of sectional planes A-A, B-B, C-C, D-D, E-E, F-F and G-G perpendicular to the central longitudinal axis 24 of the wood screw 10. The sectional plane A-A herein is somewhat removed from the terminal point 22 of the drilling tip 16. The sectional plane F-F still lies within the region of the drilling tip 16, whereas the sectional plane G-G is already disposed in the region of the shank 14.

The change in the cross section of the drilling tip 16 in the sectional planes perpendicular to the central longitudinal axis 24 can be seen by means of the sectional views of FIGS. 6 to 12.

The two longitudinal cutters 18, 20 on the drilling tip 16 are already fully formed in the sectional plane A-A, thus already shortly after the terminal point 22 of the drilling tip 16. The longitudinal cutters 18, 20 in the case of the wood screw 10 according to the invention after all run continuously up to the terminal point 22 of the drilling tip 16. The longitudinal cutters 18, 20 in the region of the sectional plane A-A herein are formed by two mutually abutting faces which therebetween enclose an angle of less than 45°.

The illustration of FIG. 7 shows the view onto the sectional plane B-B. It is to be noted here that the view onto the sectional planes A-A, B-B, C-C, D-D, E-E, F-F, and G-G is not performed at a constant rotary angle. The two longitudinal cutters 18, 20 run in each case helically across the length of the drilling tip 16. By contrast, the sectional views of FIGS. 6 to 12 are in each case illustrated from a slightly rotated viewing position.

The mutual spacing of the two longitudinal cutters 18, 20 has grown in the sectional plane B-B. The cross-sectional shape of the drilling tip 16 is however unchanged and approximately S-shaped, wherein the two corner points of said cross-sectional shape are defined by the longitudinal edges 18, 20. It can already be seen by means of the views of FIGS. 6 and 7 that only the two longitudinal cutters 18, 20 are configured on the drilling tip 16, but that the remaining circumference of the drilling tip 16 does not have any further cutters. The circumference between the two longitudinal cutters 18, 20 is configured so as to be partially convexly curved and partially concavely curved. The longitudinal cutters 18, 20 also in the sectional plane B-B are formed by two mutually abutting faces which enclose an angle of less than 45°.

FIG. 8 shows a view onto the sectional plane C-C in FIG. 5, and FIG. 9 shows a view onto the sectional plane D-D in FIG. 5. It can be seen that the two longitudinal cutters 18, 20 from the terminal point 22 of the drilling tip 16 mutually diverged at an increasing spacing, but that the cross section of the drilling tip 16 remains unchanged and approximately of S-type, wherein the corner points are defined by the longitudinal cutters 18, 20. The longitudinal cutters 18, 20 also in the sectional planes C-C and D-D are formed by faces which enclose an angle of less than 45°.

FIG. 10 shows a view onto the sectional plane E-E in FIG. 5. The longitudinal cutters 18, 20 can again be seen, said longitudinal cutters 18, 20 now however being formed by two mutually abutting faces which assume a mutual angle of more than 90°. Consequently, the longitudinal cutters 18, 20 in the sectional plane E-E are already configured so as to be comparatively blunt, and the transition to the circular cross section of the shank 14 begins already in the sectional plane E-E.

FIG. 11 shows a view onto the sectional plane F-F in FIG. 5. The longitudinal cutters 18, 20 can still be seen, but still form only a rounded protrusion. While the S-type cross section was still to be seen in the sectional plane E-E, the cross section of the drilling tip 16 in the sectional plane F-F assumes the shape of a deformed circle. This change in the cross-sectional shape of the drilling tip 16 is implemented according to the invention so as to achieve a soft transition from the S-type cross section of the drilling tip 16 to the circular cross section of the shank 14.

FIG. 12 shows a view onto the sectional plane G-G in the region of the shank 14. The beginning 26 of the thread and the shank 14 that is circular in the cross section can already be seen here. The thread at the beginning 26 thereof has a flank height of zero. On account thereof, the thread reliably engages in the depression achieved by the drilling tip 16.

The illustration of FIG. 13 shows only the drilling tip 16 of the wood screw 10 of FIG. 1, up to the end of said drilling tip 16. By contrast, the shank 14 of the screw 10 is not illustrated. The drilling tip 16 has a length L which is larger than the core diameter of the shank 14. The length of the drilling tip 16 is advantageously approximately 1.1 to 3 times the core diameter of the shank 14. The drilling tip 16 in the case of the embodiment illustrated terminates at the transition to the cylindrical threaded part of the shank. A transition region in which portions of thread pitches and/or portions of the longitudinal cutters are present can also be configured by rolling the drilling tip in the production of the thread. The transition region can then have a basic shape which tapers toward the drilling tip and/or is cylindrical.

The rotated position of the drilling tip 16 corresponds to the position of FIG. 1. In this view, the longitudinal cutters 18, 20 have the largest mutual spacing in the plane of the drawing.

It can be seen in this view that the two longitudinal cutters 18, 20, proceeding from the terminal point 22, enclose an angle α. Said angle α according to the invention is between 20° and 90°, in particular between 30° and 60°. In the case of the embodiment of FIG. 13, the angle α is approximately 30°. Even when the wood screw 10 is placed onto a wood surface at a very flat angle, such an angle between the longitudinal cutters 18, 20, adjoining the terminal point 22 of the drilling tip 16, ensures that the drilling tip 16 and the wood screw 10 bite and intrude reliably into the material of a wooden component.

It can also be seen in the illustration of FIG. 13 that the angle α which is enclosed by the longitudinal cutters 18, 20, proceeding from the terminal point 22 of the drilling tip, remains constant up to approximately one quarter of the length of the drilling tip 16 and then becomes gradually larger. The angle enclosed between the longitudinal cutters 18, 20 then gradually decreases again toward the end of the drilling tip 16, thus in the upward direction in FIG. 13, until said longitudinal cutters 18, 20 run so as to be almost mutually parallel and then transition into the core of the shank 14.

It is indicated by means of a radius R in the illustration of FIG. 13 that the longitudinal cutters 18, 20, proceeding from the terminal point 22 of the drilling tip 16, have an inwardly curved contour, thus are concavely curved in the illustration of FIG. 13. After approximately one third of the length of the drilling tip 16 said concave curvature transitions into an outwardly directed curvature, thus a convex curvature. Said convex curvature then runs approximately up to the transition into the core of the shank 14. Reliable piloting and biting of the wood screw 10 when screwing in a slanted manner is also achieved by this shaping.

The illustration of FIG. 14 shows an illustration of the drilling tip 16 corresponding to the view of FIG. 13. FIG. 15 shows an illustration of the drilling tip 16 in a rotated position about the central longitudinal axis 24 of the screw 10 that is rotated by 90° in relation to the illustration of FIG. 14. It can be seen in this view that the longitudinal cutter 20 in an envisaged rotating direction of the screw, which is indicated by means of a curved arrow 40 in FIG. 15, is outwardly curved. The longitudinal cutter 18 is configured in the same manner but is obscured in the view of FIG. 15. Looking along the circumference of the drilling tip 16 in the envisaged rotating direction 14, the longitudinal cutter 20 is thus outwardly curved.

FIG. 16 shows the drilling tip 16 of FIGS. 14 and 15 in a position that is rotated by approximately 45° in relation to the rotated position of FIG. 14. The longitudinal cutter 20 can again be seen here, and the helical profile of the longitudinal cutter 20, proceeding from the terminal point 22 of the drilling tip 16 up to the transition into the core of the shank 14, can also be seen. As has already been explained, the longitudinal cutter 18 is configured and disposed in the same manner as the longitudinal cutter 20, but is obscured in the illustration of FIG. 16.

FIG. 17 shows a view from below onto the drilling tip 16 of FIG. 14, thus on to the terminal point 22 of the drilling tip 16. The helical profile of the longitudinal cutters 18, 20 can be readily seen in this illustration, and it can also be readily seen that the circumference between the two longitudinal cutters 18, 20 does not have any further cutters.

The illustrations of FIGS. 18 and 19 show perspective views of the drilling tip 16 from in each case different viewing angles.

The illustrations of FIGS. 20 to 25 show a drilling tip 46 for a wood screw 10 according to a further embodiment of the invention. The drilling tip 46 can be disposed on the wood screw 10 of FIG. 1 instead of the drilling tip 16. The drilling tip 46 of FIGS. 20 to 25 differs from the drilling tip 16 by the curvature of the longitudinal cutters 48, 50 of said drilling tip 46. Specifically, the longitudinal cutters 48, 50 of the drilling tip 46, when viewed in the envisaged rotating direction 40 of the wood screw 10, are inwardly or concavely curved. This can be readily seen in the lateral view of FIG. 21. The longitudinal cutter 50 here is inwardly curved in a clearly visible manner. Looking along the circumference of the drilling tip 46 in the envisaged rotating direction 40, the longitudinal cutter 50 thus appears to be inwardly or concavely curved.

FIG. 22 shows a further lateral view of the drilling tip 46 in a changed rotated position. The inwardly curved configuration of the longitudinal cutter 50 can again be seen. The longitudinal cutter 48 is configured in the same manner, but is obscured in the illustration of FIG. 22.

The illustrations of FIGS. 23 to 25 show perspective views of the drilling tip 46 from different viewing angles. The concave configuration of the longitudinal cutters 48, 50 can be seen. It can furthermore be seen that the longitudinal cutters 48, 50 also continue up to the terminal point 22 of the drilling tip 46.

The drilling tip 16 of FIGS. 1 to 19 as well as the drilling tip 46 of FIGS. 20 to 25 are produced by pinching. A blank of the wood screw 10 which has a screw head and a cylindrical shank herein is disposed between two pinching jaws which are then converged. The pinching jaws therebetween receive the shank in the end portion which is provided for the drilling tip and deform said end portion to form the drilling tip 16 or 46, respectively. The illustrations of FIGS. 15 and 21 show the drilling tip 16 and 46, respectively, in a lateral view perpendicular to a moving direction of the converging pinching jaws. Arrows 52 which illustrate the converging movement of the pinching jaws are plotted in FIGS. 15 and 21. The two pinching jaws herein are converged such that the pinching jaws do not come into direct contact with one another. The longitudinal cutters 18, 20, or 48, 50, respectively, are thus not yet completed after the drilling tip 16, 46 has been fully formed, but a so-called pinching burr at the longitudinal cutters 18, 20, 48, 50 (which are only created later) is still connected to the drilling tip 16, 46.

The blank conjointly with the pinching burr is then further machined in that the thread is rolled thereonto. The pinching burr is removed when the thread is rolled, and the final configuration of the longitudinal cutters 18, 20, 48, 50 is created. Further surface machining, for example by means of electroplating or the like, can still be performed after the thread has been rolled.

The rolling of the thread not only ensures that the pinching burr is removed, but at the same time also ensures that the diameter of the drilling tip 16, 46 and of the shank 14 is aligned at the transition between the drilling tip 16, 46 and the shank 14. It can be seen by means of FIG. 2, and it has also already been explained, that the beginning 26 of the thread at the transition to the drilling tip 16 has a height of the thread flanks of nearly zero or even equal to zero. A diameter of the drilling tip 16 and consequently a height of the longitudinal cutters 18, 20, or 48, 50, respectively, is thus reduced when rolling the thread, so as to, on account thereof, provide a soft transition from the drilling tip 16, or the longitudinal cutters 18, 20, 48, 50, respectively, to the beginning 26 of the thread on the shank 14.

The invention claimed is:

1. A wood screw, comprising:
a screw head having a drive configuration,
a screw shank which emanates from the screw head and which at least in portions is provided with a thread, and
a drilling tip which is disposed on the end of the screw shank that is opposite the screw head,
wherein the drilling tip is configured without a thread, in that the drilling tip has two longitudinal cutters which continue up to a terminal point of the drilling tip and which run so as to be curved in relation to a central longitudinal axis of the wood screw, and in that a circumference of the drilling tip between the two longitudinal cutters does not have any further cutters, wherein the two longitudinal cutters run in a helical manner up to the terminal point of the drilling tip, and wherein the longitudinal cutters, when viewed in the circumferential direction and across the length (L) of the drilling tip, run in each case across at most one quarter of the circumference of the drilling tip.

2. The wood screw as claimed in claim 1, wherein the longitudinal cutters run consistently and without interruptions and corners.

3. The wood screw as claimed in claim 1, wherein the longitudinal cutters continue across the entire length of the drilling tip up to the terminal point of the latter.

4. The wood screw as claimed in claim 1, wherein the longitudinal cutters, when viewed in a driving-in direction of the thread, run so as to be outwardly curved across the entire length of the drilling tip.

5. The wood screw as claimed in claim 1, wherein the longitudinal cutters, when viewed in a driving-in direction of the thread, run so as to be inwardly curved across the entire length of the drilling tip.

6. The wood screw as claimed in claim 1, wherein the longitudinal cutters of the drilling tip, when viewed in a direction perpendicular to the central longitudinal axis, proceeding from the terminal point have an inwardly curved contour.

7. The wood screw as claimed in claim 6, wherein the outwardly curved contour of the longitudinal cutters, proceeding from the thread to the terminal point of the drilling tip, transitions to the inwardly curved contour after one quarter, in particular one third, of the length of the drilling tip.

8. The wood screw as claimed in claim 1, wherein the longitudinal cutters of the drilling tip, when viewed in a direction perpendicular to the central longitudinal axis, proceeding from the transition to the thread have an outwardly curved contour.

9. The wood screw as claimed in claim 1, wherein the longitudinal cutters at the terminal point of the drilling tip enclose an angle of 20 degrees to 90 degrees, in particular 30 degrees to 60 degrees.

10. The wood screw as claimed in claim 9, wherein the angle enclosed by the longitudinal cutters, proceeding from the terminal point of the drilling tip, remains substantially constant up to one quarter, in particular one third, of the length of the drilling tip.

11. The wood screw as claimed in claim 1, wherein the drilling tip in sectional planes which run so as to be perpendicular to the central longitudinal axis of the wood screw, at the transition to the thread initially has a circular cross section, and then up to the terminal point has an S-type cross section, wherein the two corner points of the S-type cross section are defined by the longitudinal edges.

12. The wood screw as claimed in claim 1, wherein the two longitudinal cutters, at the shank-side end of the drilling tip, in the radial direction have a mutual spacing which corresponds to the core diameter of the thread.

13. A method for producing a wood screw as claimed in claim 1, further including producing a blank having a screw head and a shank which in the portion provided for the drilling tip is cylindrical, pinching the drilling tip by converging two pinching jaws while interposing the shank; and subsequent to the pinching procedure, rolling a thread onto the shank.

14. The method as claimed in claim 13, further including removing a pinching burr when rolling the thread, said pinching burr containing material which in the pinching of the drilling tip is displaced to a region outside the drilling tip.

\* \* \* \* \*